US012345270B2

(12) United States Patent
Oniduka et al.

(10) Patent No.: US 12,345,270 B2
(45) Date of Patent: *Jul. 1, 2025

(54) PUMP

(71) Applicant: IWAKI CO., LTD., Tokyo (JP)

(72) Inventors: Toshiki Oniduka, Iruma-gun (JP); Shinichirou Koreeda, Iruma-gun (JP); Toshiaki Kamei, Sayama (JP); Takuya Seki, Sayama (JP)

(73) Assignee: IWAKI CO., LTD., Tokyo (JP)

( * ) Notice: Subject to any disclaimer, the term of this patent is extended or adjusted under 35 U.S.C. 154(b) by 579 days.

This patent is subject to a terminal disclaimer.

(21) Appl. No.: 17/625,140

(22) PCT Filed: Jul. 13, 2020

(86) PCT No.: PCT/JP2020/027209
§ 371 (c)(1),
(2) Date: Jan. 6, 2022

(87) PCT Pub. No.: WO2021/015034
PCT Pub. Date: Jan. 28, 2021

(65) Prior Publication Data
US 2022/0268287 A1    Aug. 25, 2022

(30) Foreign Application Priority Data
Jul. 19, 2019    (JP) .................... 2019-133914

(51) Int. Cl.
*F04D 29/048*    (2006.01)
*F04D 13/06*    (2006.01)
(Continued)

(52) U.S. Cl.
CPC ....... *F04D 29/048* (2013.01); *F04D 13/0633* (2013.01); *F04D 25/026* (2013.01); *F04D 29/18* (2013.01); *F04D 29/40* (2013.01)

(58) Field of Classification Search
CPC .. F04D 29/048; F04D 13/0633; F04D 25/026; F04D 29/18; F04D 29/40
See application file for complete search history.

(56) References Cited

U.S. PATENT DOCUMENTS 5,961,291 A * 10/1999 Sakagami ............... F04D 29/70
417/42
6,268,674 B1 * 7/2001 Takahashi ........... F16C 32/0468
310/90.5

(Continued)

FOREIGN PATENT DOCUMENTS

EP    1 942 282 A1    7/2008
EP    3 940 235 A1    1/2022
(Continued)

OTHER PUBLICATIONS

Esri and Li Zhou, The World is Full of Circles, Dec. 3, 2015, Smithsonian, Travel (Year: 2015).*
(Continued)

*Primary Examiner* — Topaz L. Elliott
*Assistant Examiner* — Andrew J Marien
(74) *Attorney, Agent, or Firm* — Oliff PLC

(57) ABSTRACT

A pump includes: a rotor; a magnetic bearing supporting the rotor by a magnetic force; a drive mechanism rotationally driving the rotor; a pump mechanism including an impeller attached to the rotor; and a control unit controlling the magnetic bearing which includes: a bearing rotor member in the rotor formed from a magnetic material; and a bearing stator member facing the bearing rotor member, the bearing stator member has: a core formed from a magnetic material; and a coil wound around the core, the drive mechanism includes: a driven member adjacent in a radial direction to the bearing rotor member; and a drive portion facing the driven member in the radial direction, and magnetically coupled to the driven member to drive the rotor, and the (Continued)

control unit corrects rotational position of the rotor based on a detection signal from a first sensor portion capable of detecting displacement of the rotor.

13 Claims, 10 Drawing Sheets

(51) Int. Cl.
*F04D 25/02* (2006.01)
*F04D 29/18* (2006.01)
*F04D 29/40* (2006.01)

(56) References Cited

U.S. PATENT DOCUMENTS 6,373,159 B1  4/2002  Shinozaki
2007/0297923 A1* 12/2007 Tada ................... A61M 60/237
                                                   417/423.1

FOREIGN PATENT DOCUMENTS

| JP | 2001-093967 A | 4/2001 | |
|---|---|---|---|
| JP | 2005-121157 A | 5/2005 | |
| JP | 2006-226390 A | 8/2006 | |
| WO | 2015/137126 A1 | 9/2015 | |
| WO | WO2015137126 * | 9/2015 | ............. F04D 13/00 |

OTHER PUBLICATIONS

Sep. 1, 2020 International Search Report issued in International Patent Application No. PCT/JP2020/027209.

Jan. 25, 2022 International Preliminary Report on Patentability issued in International Patent Application No. PCT/JP2020/027209.

Aug. 4, 2022 Search Report issued in European Patent Application No. 20843534.7.

* cited by examiner

M-M' Cross Section

PUMP

TECHNICAL FIELD

The present invention relates to a pump.

BACKGROUND ART

There is known a pump comprising: a magnetic bearing that supports the likes of load of an impeller of a pump device in a contactless manner by a magnetic force; and a drive portion that drives by magnetic coupling a driven member provided in the impeller (refer to Patent Document 1, for example). This pump has a magnet bearing configured by a bearing magnet acting as a rotor member and provided in an outer periphery of a rotor of the impeller, and magnetic cores acting as a stator member and disposed at a position facing the bearing magnet on an inner periphery of a housing. Furthermore, a bias magnet is disposed between the magnetic cores. As a result, an interacting force of the bearing magnet and the bias magnet biases the impeller asymmetrically in a certain radial direction and stops the rotor at a certain position, whereby circling motion of the rotor is suppressed.

PRIOR ART DOCUMENT

Patent Document

Patent Document 1: Japanese Laid-Open Patent Publication No. 2006-226390

SUMMARY OF THE INVENTION

Problem to be Solved by the Invention

However, because the stator member of the magnetic bearing in the pump of conventional technology disclosed in above-described Patent Document 1 is configured by a simple permanent magnet and magnetic material. Therefore, there is a risk of a bearing mechanism failing depending on a load of the pump or kind of transferred fluid. Moreover, there is a problem that it is more difficult for rotational control including the likes of positional control or postural control of the rotor to be accurately performed according to operation conditions such as load of the pump, compared to in a stator member configured by an electromagnet where magnetic force is controllable by the likes of an excitation current flowing in a rotating coil.

The present invention, which was made in view of the above-described circumstances, has an object of providing a pump in which rotational control of a rotor appropriate to operation conditions of the pump can be accurately performed.

Means for Solving the Problem

A pump according to the present invention comprises: a rotor; a magnetic bearing that supports the rotor by a magnetic force; a drive mechanism that rotationally drives the rotor; a pump mechanism including an impeller which is attached to the rotor; and a control unit that controls the magnetic bearing, the magnetic bearing comprising: a bearing rotor member formed from a magnetic material and provided in the rotor; and a bearing stator member disposed so as to face the bearing rotor member, the bearing stator member having: a core formed from a magnetic material; and a coil wound around the core, the drive mechanism comprising: a driven member provided adjacently in a radial direction to the bearing rotor member in the rotor; and a drive portion that is disposed facing the driven member in the radial direction, and is magnetically coupled to the driven member to drive the rotor, and the control unit correcting rotational position of the rotor based on a detection signal from a first sensor portion provided so as to be capable of detecting displacement of the rotor.

In one embodiment of the present invention, the core of the bearing stator member is formed in such a manner that its longitudinal sectional shape has: a first portion which extends in a first direction orthogonal to a direction of facing the bearing rotor member, and around which the coil is wound; a pair of second portions that extend to a bearing rotor member side from both end portions in the first direction of the first portion, and then extend in an orientation of approaching each other in the first direction; and a pair of third portions that extend toward the bearing rotor member side from each of tip portions of the pair of second portions.

In another embodiment of the present invention, the drive portion is disposed on an inner side in the radial direction of the driven member, and a plurality of the bearing stator members are disposed on an outer side in the radial direction of the bearing rotor member, and each face the bearing rotor member in the radial direction.

In yet another embodiment of the present invention, the drive portion is disposed on an outer side in the radial direction of the driven member, and a plurality of the bearing stator members are disposed on an inner side in the radial direction of the bearing rotor member, and each face the bearing rotor member in the radial direction.

In yet another embodiment of the present invention, the pump comprises: a second sensor portion that detects rotational speed of a drive motor rotationally actuating the drive portion; and a third sensor portion that detects rotational speed of the rotor, wherein the control unit corrects rotational synchronization of the drive motor and the rotor based on detection signals from the second and third sensor portions.

In yet another embodiment of the present invention, the pump mechanism comprises: a casing that forms a housing space for housing the rotor; and an auxiliary member which is provided in a portion on an opposite side in an axial direction to the housing space of the casing, and that attracts the rotor by a certain magnetic force.

In yet another embodiment of the present invention, the rotor has: a bearing/driven assembly formed by integrally fixing the bearing rotor member and the driven member; and a housing portion capable of housing the bearing/driven assembly on its inside in a state that movement has been restricted in a rotational direction, and the bearing/driven assembly has: the bearing rotor member; the driven member disposed on an inner side or outer side in a radial direction of the bearing rotor member; and a rotation restricting member that couples the bearing rotor member and the driven member in a state that their movement in a rotational direction with respect to each other has been restricted.

In yet another embodiment of the present invention, the bearing rotor member has: an annular permanent magnet; and a pair of annular yokes disposed so as to sandwich the permanent magnet in the first direction, the driven member has a plurality of permanent magnets that are magnetized in a radial direction so that their N poles and S poles are disposed alternately in a peripheral direction of the rotor, the rotation restricting member includes: a cylindrical portion inserted in an interposing manner between the bearing rotor member and the driven member; and a flange portion that abuts on an end surface in the first direction of the bearing rotor member, and whose shape viewed in an axial direction has an outer shape other than a perfectly circular shape, has formed on an inner peripheral surface or outer peripheral surface of its cylindrical portion claw portions that catch on edge portions at boundaries in the peripheral direction of the plurality of permanent magnets of the driven member, and has formed on an abutting surface with the end surface of the bearing rotor member of its flange portion a projection portion that engages with a recess portion provided in the end surface, and the housing portion has an engaging portion which is formed in a shape matching the outer shape of the flange portion.

In yet another embodiment of the present invention, the control unit judges an abnormality of the magnetic bearing based on information expressing a state of the magnetic bearing including the detection signals, and stops operation of the drive mechanism based on a judgment result.

In yet another embodiment of the present invention, the pump further comprises: a rotating blade attached to a rotating shaft of the drive motor to rotate along with the rotating shaft; and a substrate which is disposed at a position facing the rotating blade in an axial direction of the rotating shaft, and that supplies an excitation current to the coil of the bearing stator member of the magnetic bearing.

Effect of the Invention

Due to the present invention, rotational control of a rotor appropriate to operation conditions of the pump can be accurately performed.

EMBODIMENTS FOR CARRYING OUT THE INVENTION

Pumps according to embodiments of the present invention will be described in detail below with reference to the accompanying drawings. However, the embodiments below do not limit the inventions according to each of the claims, moreover, not all of the combinations of features described in the embodiments are necessarily essential to the means for solving the problem of the invention. Moreover, in the embodiments below, configuring elements that are the same or equivalent will be assigned with the same symbols, and repeated explanations thereof will be omitted. Moreover, it is assumed that the embodiments will sometimes be shown in a state where reduction scales or dimensions of each of the configuring elements are inconsistent with reality, and will sometimes be shown with some of the configuring elements omitted.

First Embodiment

[Configuration of Pump]

Figure 1:
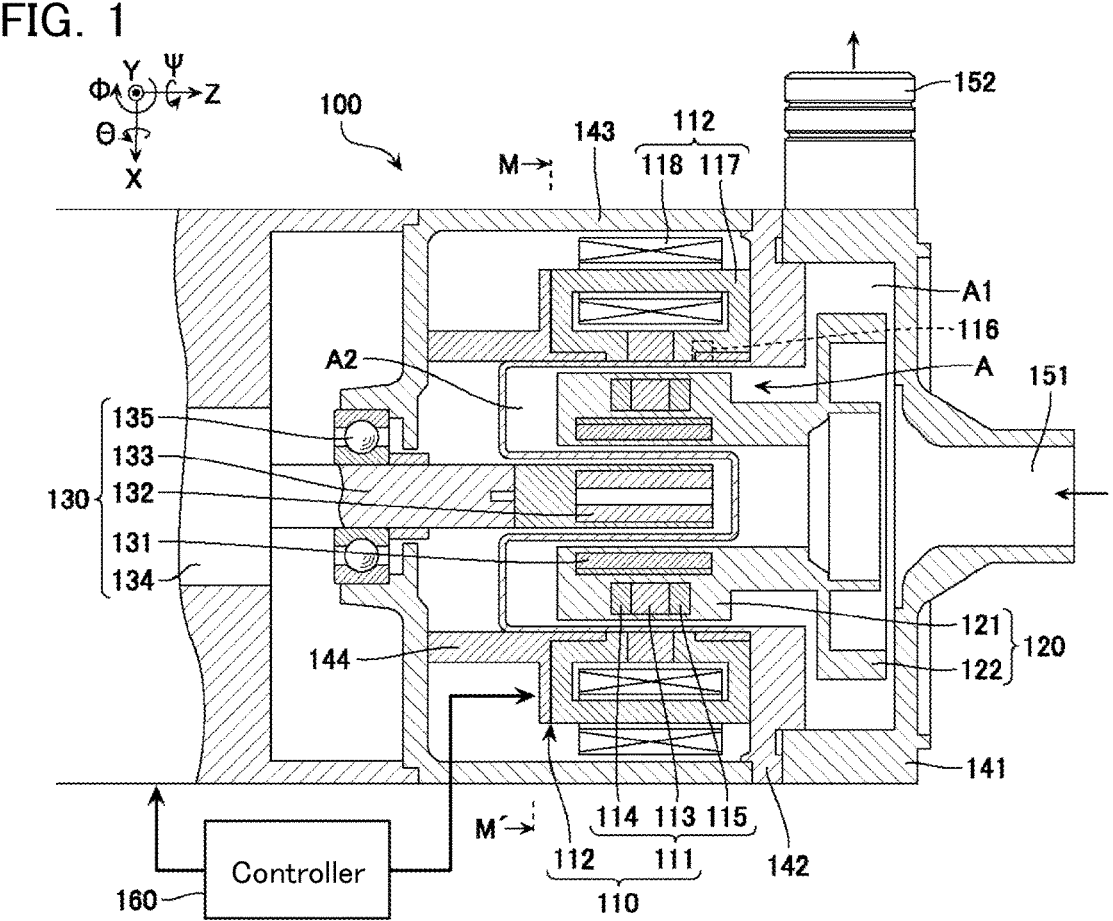
FIG. 1 is a longitudinal sectional view showing schematically an overall configuration of a pump according to a first embodiment of the present invention, with part of the overall configuration omitted.
Figure 2:
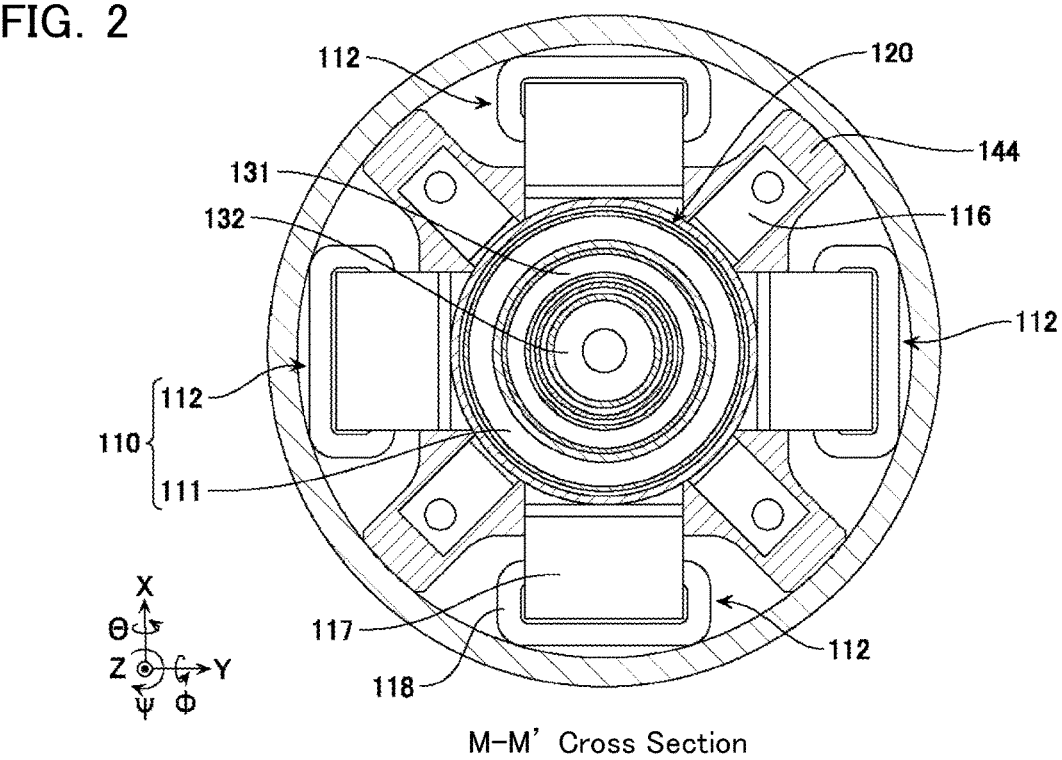
FIG. 2 is a cross-sectional view taken along the line M-M' of FIG. 1.
Figure 3:
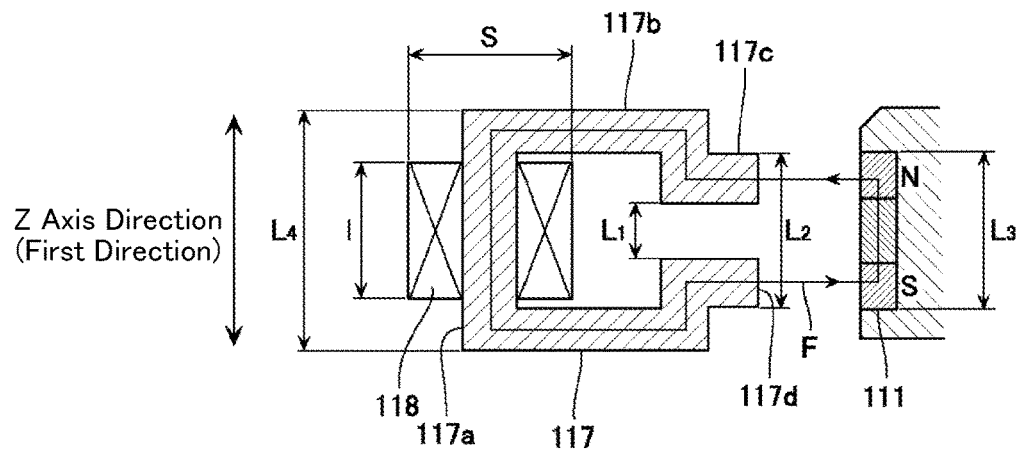
FIG. 3 is an enlarged longitudinal sectional view showing schematically a magnetic bearing of same pump.

FIG. 1 is a longitudinal sectional view showing schematically an overall configuration of a pump 100 according to a first embodiment, with part of the overall configuration omitted. FIG. 2 is a cross-sectional view taken along the line M-M' of FIG. 1; and FIG. 3 is an enlarged longitudinal sectional view showing schematically a magnetic bearing 110 of the pump 100.

As shown in FIG. 1, the pump 100 according to the first embodiment, which is employed as a magnet pump for fluid transfer, comprises: a rotor 120; the magnetic bearing 110 that supports this rotor 120 in a contactless manner by a magnetic force; a drive mechanism 130 of magnetic coupling type that rotationally drives the rotor 120; a pump mechanism including an impeller 122 which is attached to the rotor 120; and a controller 160 acting as a control unit capable of controlling at least the magnetic bearing 110.

Note that in the description hereafter, a direction of a rotational axis of the rotor 120 (a Z axis) is going to be called a Z axis direction (and is also going to be called an axial direction and a Z direction); a radial direction of the rotor 120 is going to be called an X axis direction and a Y axis direction (and is also going to be called a radial direction, an X direction, and a Y direction); a direction of rotation around the Z axis (rotational axis) is going to be called a Ψ direction; a direction of rotation around the X axis is going to be called a Θ direction; and a direction of rotation around the Y axis is going to be called a Φ direction. Moreover, the X axis, the Y axis, and the Z axis are assumed to be orthogonal to each other. Moreover, a right side when facing the paper surface is assumed to be a front side of the pump 100, and a left side when facing the paper surface is assumed to be a rear side of the pump 100.

The pump 100, whose entirety is formed in a cylindrical shape, has a front casing 141 on one side in the Z axis direction thereof. The front casing 141, which forms a pump chamber A1 on its inside, has in its front center portion a cylindrical inlet port 151 communicating with the pump chamber A1, and has in its side surface a discharge port 152 likewise communicating with the pump chamber A1. A rear end of the front casing 141 is connected with a rear casing 142. The rear casing 142, together with the front casing 141, forms a sealed space A that includes the pump chamber A1. In addition, the rear casing 142 forms a rearwardly-projecting annular space (housing space) A2. A cylindrical bracket 143 is provided covering an outer periphery of this rear casing 142.

The sealed space A houses the rotor 120. The rotor 120, whose entirety is formed by a non-magnetic body of the likes of a resin, for example, is configured having formed integrally therein: the impeller 122 provided on its front side being one end in the axial direction thereof; and an annular bearing/driven portion 121 provided on its rear side being the other end in the axial direction thereof. The impeller 122 is housed in the pump chamber A1, and, together with the pump chamber A1, configures the pump mechanism. The bearing/driven portion 121 is housed in the annular space A2.

An outer peripheral side of the bearing/driven portion 121 of the rotor 120 is provided with the magnetic bearing 110 that supports the rotor 120 by a magnetic force. Moreover, an inner peripheral side of the bearing/driven portion 121 of the rotor 120 is provided with the drive mechanism 130 that drives the rotor 120.

The magnetic bearing 110 has: a bearing rotor member 111 which is annular, configured from a magnetic material, and mounted on the outer peripheral side of the bearing/driven portion 121 of the rotor 120; and a bearing stator member 112 disposed at a certain interval from this bearing rotor member 111 on an outer side in the radial direction of the bearing rotor member 111. The bearing stator member 112 is mounted between the rear casing 142 and the cylindrical bracket 143.

The bearing rotor member 111 has, for example: a permanent magnet 113 which is configured from a circular annularly formed neodymium magnet; and yokes 114, 115 which are annular, configured from electromagnetic soft iron, and disposed concentrically with this permanent magnet 113 so as to sandwich the permanent magnet 113 in the axial direction (Z axis direction). The permanent magnet 113 is magnetized in such a manner that its N pole and S pole face in the axial direction, and so as to be homo-polar over an entire periphery in a peripheral direction, for example.

On the other hand, in this embodiment, as shown in FIG. 2, there are bearing stator members 112 disposed spaced at angles of 90° at four places in the peripheral direction of the bearing rotor member 111. The pair of bearing stator members 112 facing in the X axis direction, for example, of these bearing stator members 112 control position in the X axis direction and angle in the Φ direction of the rotor 120, and the pair of bearing stator members 112 facing in the Y axis direction, for example, of these bearing stator members 112 control position in the Y axis direction and angle in the Θ direction of the rotor 120 (not illustrated). Moreover, these bearing stator members 112 control height in the Z axis direction.

Note that a plurality of (here, four) displacement sensors (first sensor portions) 116 capable of detecting displacement in the radial direction and each of rotational directions of the bearing rotor member 111 are disposed in a yoke base 144, so as to be at angles of 45° to each of the bearing stator members 112 (that is, so as to intersect each of the X axis direction and the Y axis direction at angles of 45°). Although these displacement sensors 116 may each be an eddy current type sensor, for example, they are not thus limited, and there may be adopted a variety of sensors therefor. Moreover, the number of bearing stator members 112 is not limited to four, and there may be adopted various forms in which there are six, 10, 12, 16, and so on, thereof. In addition, the displacement sensor may include also a sensor (unillustrated) capable of detecting displacement in the axial direction and rotational directions of the bearing rotor member 111, and so on, disposed in the likes of the yoke base 144 so as to face the bearing/driven portion 121 in the axial direction, for example, along with the above-described displacement sensor 116. Note that dispositional states or number of the displacement sensors 116, and so on, are not thus limited, and there may be adopted a variety of forms therefor. In the case of the pump 100 of the present embodiment, the impeller 122 is disposed on one side of the rotor 120, so when the rotor 120 inclines to the Z axis, the rotor 120 inclines with its rotational center at a position close to the impeller 122 on the Z axis. Therefore, if it is decided that the displacement sensor 116 be disposed at a position separated from the impeller 122, and, preferably, at a position of a center in the Z axis direction of the bearing/driven portion 121, for example (although illustration of this is omitted), then it will be possible for position in the X axis direction and angle in the Φ direction, and for position in the Y axis direction and angle in the Θ direction, of the rotor 120 to be detected by the displacement sensor 116, hence it will become possible for inclination of the rotational axis to be sufficiently controlled by biaxial control.

The bearing stator member 112 has, for example: a core 117 formed from a magnetic material such as a laminated electromagnetic steel plate; and a coil 118 wound around the core 117. A longitudinal sectional shape of the core 117 is formed in substantially a C shape having its open end on a bearing rotor member 111 side. Specifically, as shown in FIG. 3, the longitudinal sectional shape of the core 117 includes: a first portion 117a which extends in a first direction (in this example, the Z axis direction) orthogonal to a direction of facing the bearing rotor member 111 (the radial direction), and around which the coil 118 is wound; a pair of second portions 117b that extend to the bearing rotor member 111 side from both end portions in the Z axis direction of this first portion 117a, and then extend in an orientation of approaching each other in the Z axis direction; and a pair of third portions 117c that extend toward the bearing rotor member 111 side from each of tip portions of this pair of second portions 117b. In other words, it could be said that in the core 117, in the longitudinal sectional shape, at open end portions of its C shape that would normally extend linearly toward the bearing rotor member 111 from both ends in the Z axis direction of the first portion 117a wound around by the coil 118, there are a pair of hook-shaped portions, and that the core 117 has a shape where the portions on its open end side approach each other.

In the case of there being such a shape, as shown in FIG. 3, a length l in the Z axis direction of the coil 118 can be made larger than a distance L1 between facing surfaces in the Z axis direction of the pair of third portions 117c on the open end side of the core 117. That is, the distance between tips at the open end can be made smaller than the length in the Z axis direction of a wound portion of the coil 118. Moreover, a width on the open end side of the core 117, that is, a distance L2 between surfaces on an opposite side to the facing surfaces in the Z axis direction of the pair of third portions 117c is of a size smaller than an original length L4 in the Z axis direction of the core 117, and substantially equal to a length L3 in the Z axis direction of the bearing rotor member 111.

The drive mechanism 130 has: a driven magnet 131 acting as a driven member, which is annular and is mounted on the inner peripheral side of the bearing/driven portion 121 of the rotor 120; and a drive magnet 132 acting as a drive portion, which is disposed at a certain interval from this driven magnet 131 on an inner side in the radial direction of the driven magnet 131. In addition, the drive mechanism 130 has: a motor shaft 133 which has this drive magnet 132 mounted in its tip portion, and is rotatably supported by a bearing 135; and a drive motor 134 that rotationally drives this motor shaft 133. In this example, the driven magnet 131 and the drive magnet 132 are each configured from a neodymium magnet magnetized in a 2-polar or 4-polar manner in the radial direction, for example. Moreover, in this example, the drive magnet 132 and the motor shaft 133 are shown having substantially the same diameters. However, the two need not necessarily have the same diameters.

The controller 160 detects displacement in each direction and each rotational direction of the rotor 120, based on a detection signal from a displacement sensor including the above-mentioned displacement sensor 116, and, accordingly, finely controls current flowing in the coil 118 of the bearing stator member 112 of the magnetic bearing 110. As a result, the controller 160 controls position in the X axis direction and angle in the Φ direction, position in the Y axis direction and angle in the Θ direction, and height in the Z axis direction, of the rotor 120, in real time, and thereby corrects rotational position of the rotor 120. Note that the controller 160 may be configured to control the drive mechanism 130 based on a detection signal from later-mentioned other sensors.

[Operation of Pump]

Next, operation of the pump 100 configured as above will be described.

In the pump 100 configured in this way, the bearing rotor member 111 and the core 117 of the bearing stator member 112 configuring the magnetic bearing 110 are configured by a magnetic material, and so form a magnetic circuit. The permanent magnet 113 of the bearing rotor member 111 supplies a bias magnetic flux to this magnetic circuit.

In order for the controller 160 to correct displacement in each of the XYZ axis directions and inclination in the Φ and Θ directions of the rotor 120 detected by the likes of the displacement sensor 116, it controls current flowing in the coil 118 as described above, and thereby adjusts a control magnetic flux generated by the coil 118. As a result, the rotor 120 is supported in a contactless state while maintaining a certain position and certain posture, by the magnetic bearing 110.

Due to the motor shaft 133 being rotated by the drive motor 134 in this state, the drive magnet 132 rotates, and due to a magnetic force of this drive magnet 132, the driven magnet 131 is driven, whereby the rotor 120, that is, the impeller 122 rotates in a contactless manner within the sealed space A. As a result, the transfer fluid is introduced into the pump chamber A1 via the inlet port 151, and the transfer fluid is discharged to outside from within the pump chamber A1 via the discharge port 152.

[Advantages of Embodiment]

Now, in a general magnetic bearing adopted in a pump, a magnetic flux F passing through a magnetic circuit formed by a U-shaped core configuring a bearing stator member, and a bearing rotor member results in there acting a restoring force to a prescribed position on the rotor. It is known regarding this restoring force that, for example, the more substantially a length in an axial direction of the core of the bearing stator member is equal to a thickness in the axial direction of the bearing rotor member is, and the more extremely thin this thickness is, the larger the restoring force will be.

On the other hand, since the magnetic flux F is controlled by the coil, it is desirable for inductance of the coil to be reduced to the utmost in order to increase responsiveness. This inductance of the coil is known to be proportional to cross-sectional area of the coil and inversely proportional to coil length, so in order to raise responsiveness, the coil needs to be wound on the core in such a manner that its length is made long while its cross-sectional area is made small.

However, considering the above-described points, if coil length lengthens, then thickness in the axial direction of the bearing rotor member of the rotor ends up increasing too, thereby resulting in the restoring force of the rotor ending up lowering, and, specifically resulting in restoring torque when the rotor has inclined lowering and size of the magnetic bearing in the axial direction ending up increasing.

That is, applying this point to the magnetic bearing 110 of the pump 100 of the present embodiment, it becomes clear that, as described above, regarding the restoring force of position and inclination by the magnetic bearing 110 of the rotor 120, the more substantially the length L3 in the Z axis direction of the bearing rotor member 111 is equal to the length L2 in the Z axis direction of the third portions 117c being the open end of the bearing stator member 112 is, and the shorter the length L3 in the Z axis direction of the bearing rotor member 111 is, the larger this restoring force will be.

In this regard, the magnetic bearing 110 of the pump 100 of the present embodiment enables the length L2 in the Z axis direction of the third portions 117c being portions facing the bearing rotor member 111 at the open end, to be made shorter compared to in the above-described general U-shaped core, so the length L3 in the Z axis direction of the bearing rotor member 111 can be configured shorter than a general one, while a required number of winds of the coil 118 is maintained. As a result, a sufficient restoring force can be secured.

Note that in order to maximize attractive force of the permanent magnet 113, it is desirable for distance L1 between the third portions 117c of the core 117 and height in the Z axis direction of the permanent magnet 113 to be substantially equal, and for width in the Z axis direction of each third portion 117c of the core 117 to be substantially equal to thickness in the Z axis direction of the yokes 114, 115.

Moreover, in order to increase responsiveness of the magnetic bearing 110, inductance of the coil 118 needs to be reduced to the utmost, and in this respect too, the magnetic bearing 110 of the pump 100, due to its having a structure enabling length L4 of the first portion 117a wound around by the coil 118 of the core 117 to be sufficiently secured, makes it possible for length l in the Z axis direction of the coil 118 to be made long and cross-sectional area of the coil 118 to be made small, and enables inductance of the coil 118 to be suppressed and responsiveness thereby improved.

Note that although, as shown in FIG. 2, an outer peripheral surface of the bearing rotor member 111 is configured by a curved surface, magnetic pole surfaces 117*d* (refer to FIG. 3) of the core 117 are each formed by a planar surface. Specifically, the magnetic pole surfaces 117*d* are formed in the same plane extending in the X axis direction or Y axis direction and the Z axis direction. Generally, when the magnetic pole surfaces 117*d* of the core 117 are configured by curved surfaces following the outer peripheral surface of the bearing rotor member 111, the magnetic flux F of a magnetic field ends up concentrating at end portions in a peripheral direction of the magnetic pole surfaces 117*d*. However, if the magnetic pole surfaces 117*d* are formed by planar surfaces, then it becomes possible for such a concentration of the magnetic flux F to be prevented.

Thus, the pump 100 according to the present embodiment enables five degrees of freedom of the radial direction, the axial direction, and the two radial rotating axis directions to be controlled as mentioned above by the magnetic bearing 110 and the controller 160, so restoring force and responsiveness of the rotor 120 can be increased, and it becomes possible for rotational control of the rotor 120, and, consequently, the impeller 122 appropriate to operation conditions of the pump 100, to be accurately performed. Moreover, since a cross section of the coil 118 of the magnetic bearing 110 can be reduced, the pump 100 can be configured with a small-diameter cylindrical shape overall including the drive motor 134 and the pump mechanism. The pump 100 is therefore compact and highly exchangeable with other pumps.

Second Embodiment

[Other Configuration of Pump]

Figure 4:
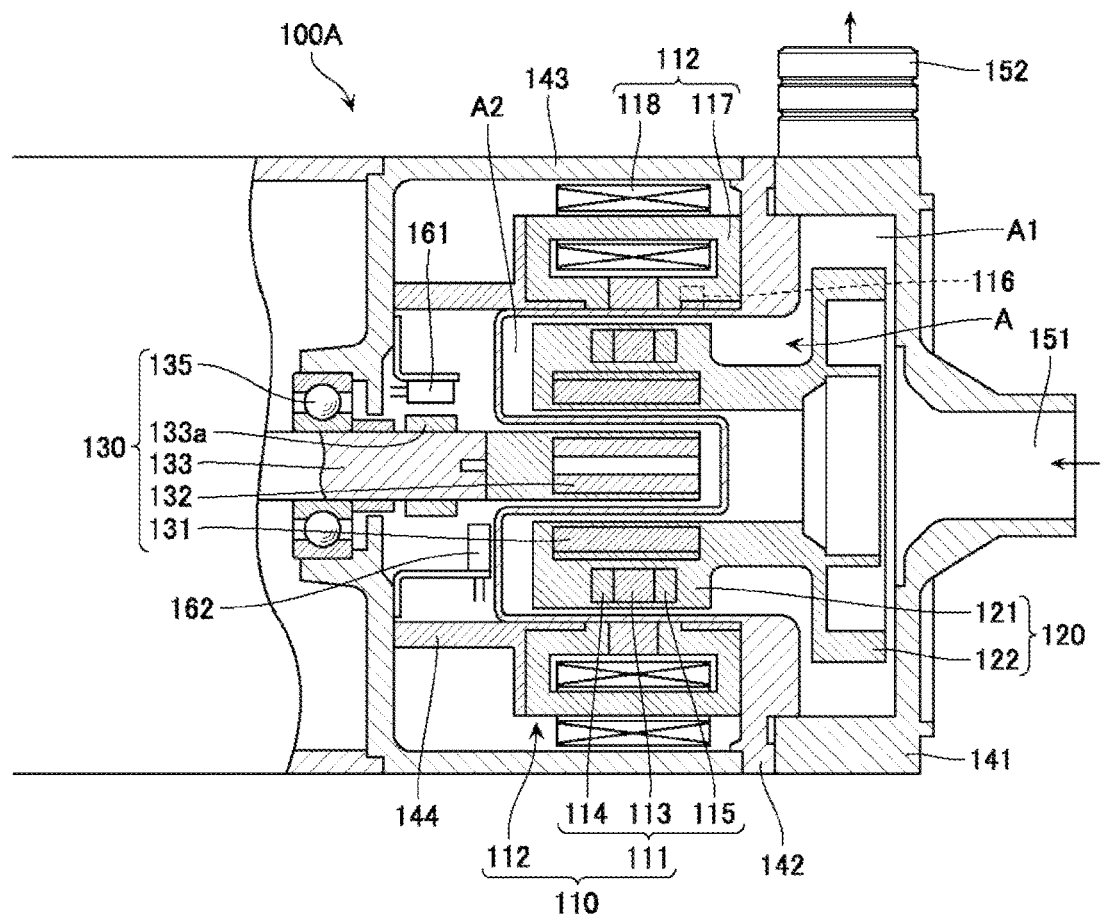
FIG. 4 is a longitudinal sectional view showing schematically an overall configuration of a pump according to a second embodiment of the present invention, with part of the overall configuration omitted.

FIG. 4 is a longitudinal sectional view showing schematically an overall configuration of a pump 100A according to a second embodiment of the present invention, with part of the overall configuration omitted. Now, in the description from here onwards including FIG. 4, configuring elements that are the same as in the first embodiment will be assigned with the same symbols as in the first embodiment, and repeated explanations thereof will thus be omitted. Moreover, illustration of the drive motor 134 of the drive mechanism 130 and of the controller 160 will be omitted.

That is, as shown in FIG. 4, the pump 100A according to the second embodiment differs from the pump 100 of the first embodiment in having fitted to its motor shaft 133 a magnet 133*a* for detecting rotational speed of the motor shaft 133, and in comprising in a bottom portion (a portion on a bearing 135 side) of its bracket 143: a detector element (a second sensor portion) 161 that detects this magnet 133*a*; and a detector element (a third sensor portion) 162 that detects the driven magnet 131.

This second embodiment enables a so-called step-out detecting function to be provided. That is, the bearing rotor member 111 in a floating state in the magnetic bearing 110 rotates along with the driven magnet 131 in the bearing/driven portion 121 of the impeller 122. Moreover, this driven magnet 131 rotates synchronously with the drive magnet 132 due to magnetic attractive force of the drive magnet 132.

In such operation, when an excessive load has been applied to the impeller 122, the motor shaft 133 continues rotation, but due to the driven magnet 131 being provided in the bearing/driven portion 121 which is integrated with the impeller 122, this driven magnet 131 ends up being acted on by a force attempting to stop rotation.

Moreover, the driven magnet 131 and the drive magnet 132 synchronized by magnetic attractive force end up attaining a state of so-called step-out where they become unable to synchronize due to being unable to withstand the load applied to the impeller 122. In the case of this step-out having been reached, the impeller 122 ends up becoming unable to be rotated.

Accordingly, it was decided to use the controller 160 to calculate rotational speed of the motor shaft 133 based on a detection signal from the detector element 161, and calculate rotational speed of the driven magnet 131 (that is, rotational speed of the impeller 122) based on a detection signal from the detector element 162, and, by comparing these rotational speeds, perform a step-out judgment.

By configuring so that in the case where a result of the step-out judgment leads to it being judged that step-out has occurred, the controller 160 will once stop rotation by the drive motor 134 to re-perform rotation, for example, it becomes possible for the driven magnet 131 and the drive magnet 132 to be coupled by magnetic attractive force and for the motor shaft 133 and the impeller 122 to be synchronously rotated (have their rotational synchronization corrected).

Third Embodiment

[Yet Another Configuration of Pump]

Figure 5:
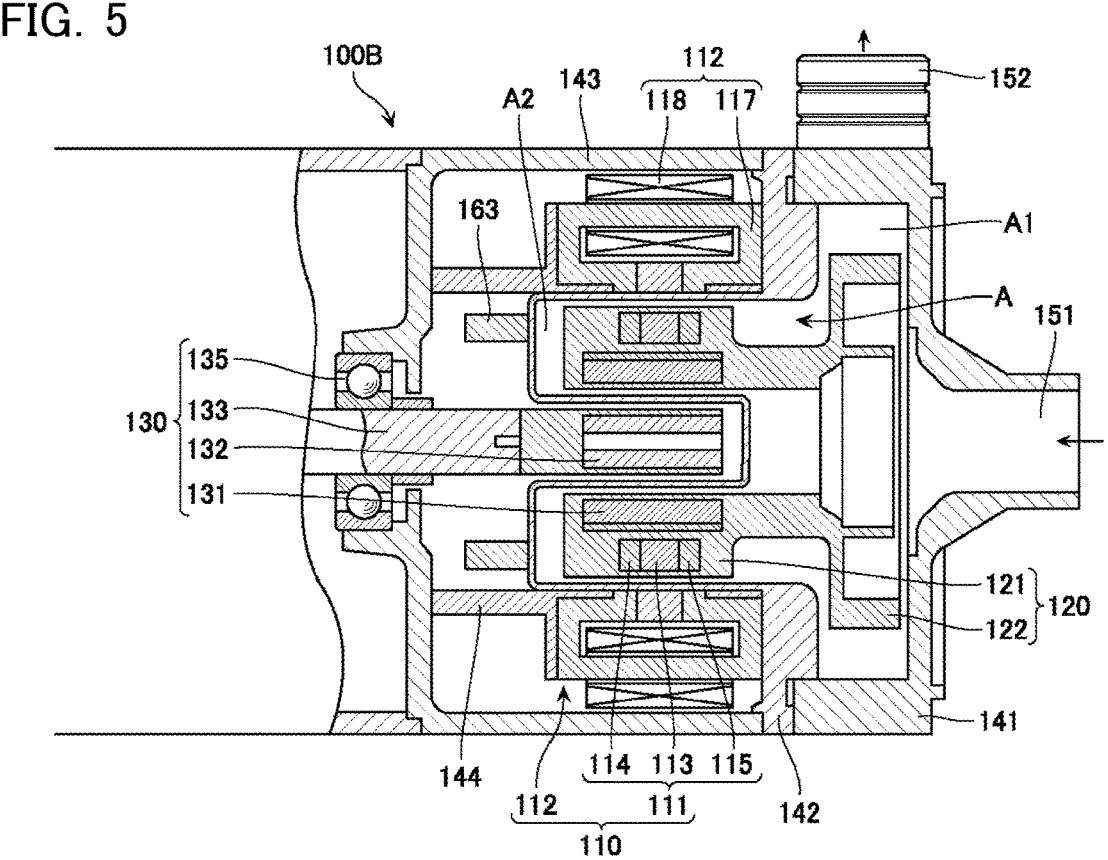
FIG. 5 is a longitudinal sectional view showing schematically an overall configuration of a pump according to a third embodiment of the present invention, with part of the overall configuration omitted.

FIG. 5 is a longitudinal sectional view showing schematically an overall configuration of a pump 100B according to a third embodiment of the present invention, with part of the overall configuration omitted.

As shown in FIG. 5, the pump 100B according to the third embodiment differs from the pump 100 of the first embodiment in comprising on a surface on an opposite side in the Z axis direction to the annular space A2 of its rear casing 142 an auxiliary magnet 163 acting as an auxiliary member that attracts the bearing rotor member 111 by a magnetic attractive force.

When the impeller 122 rotates to start fluid delivery, a fluid force of the transferred fluid results in the impeller 122 being acted on by a thrust force moving it in the axial direction. Hence, although the impeller 122 moves to a front side of the pump 100B, support by the magnetic bearing 110 results in the impeller 122 being maintained in a floating state.

However, when applied with a thrust force destroying support by the magnetic bearing 110, the impeller 122 ends up contacting the front casing 141 and getting broken. In order to prevent such a malfunction, the auxiliary magnet 163 attracts the bearing rotor member 111 to a rear side in the Z axis direction, and prevents movement in the axial direction of the impeller 122. Note that a magnetic force of the auxiliary magnet 163 is set to a level that support by the magnetic bearing 110 will not collapse and a level that the impeller 122 will not move in the axial direction. Moreover, the auxiliary magnet 163, in the same way as the permanent magnet 113 of the bearing rotor member 111, is magnetized in such a manner that its N pole and S pole face in the axial direction, and so as to be homo-polar over an entire periphery in a peripheral direction.

Fourth Embodiment

[Yet Another Configuration of Pump]

Figure 6:
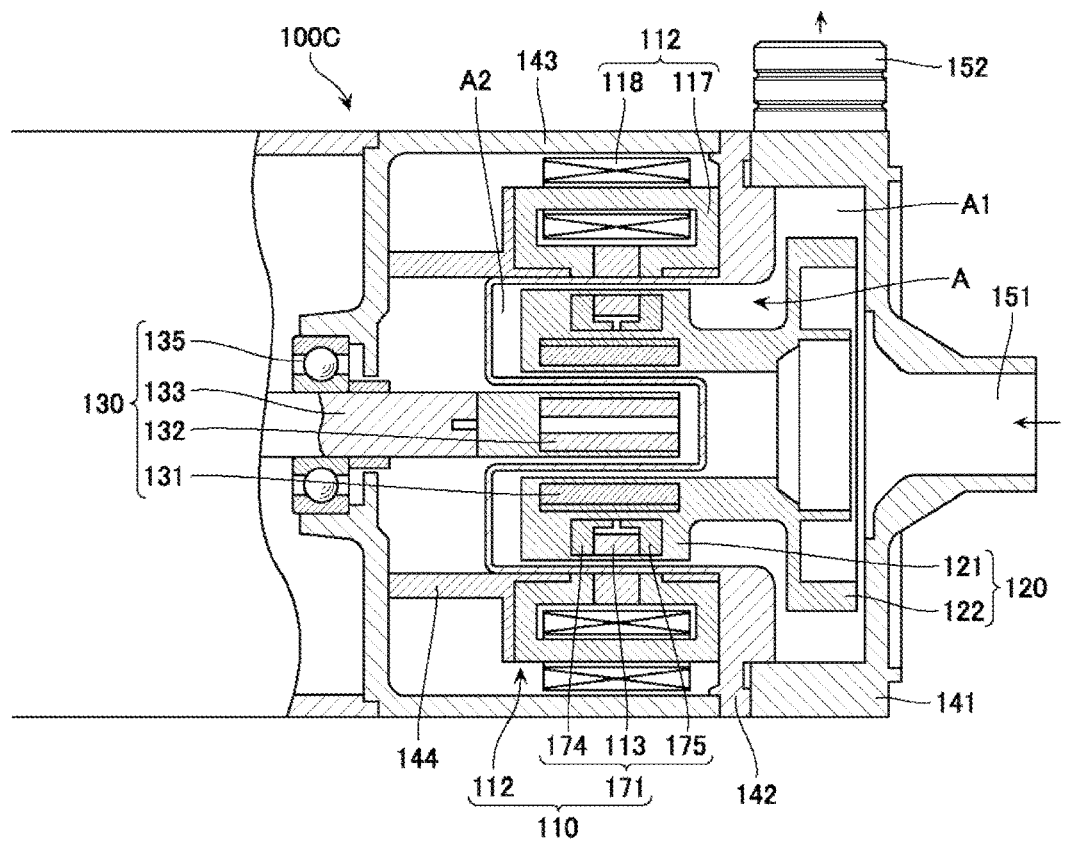
FIG. 6 is a longitudinal sectional view showing schematically an overall configuration of a pump according to a fourth embodiment of the present invention, with part of the overall configuration omitted.
Figure 7:
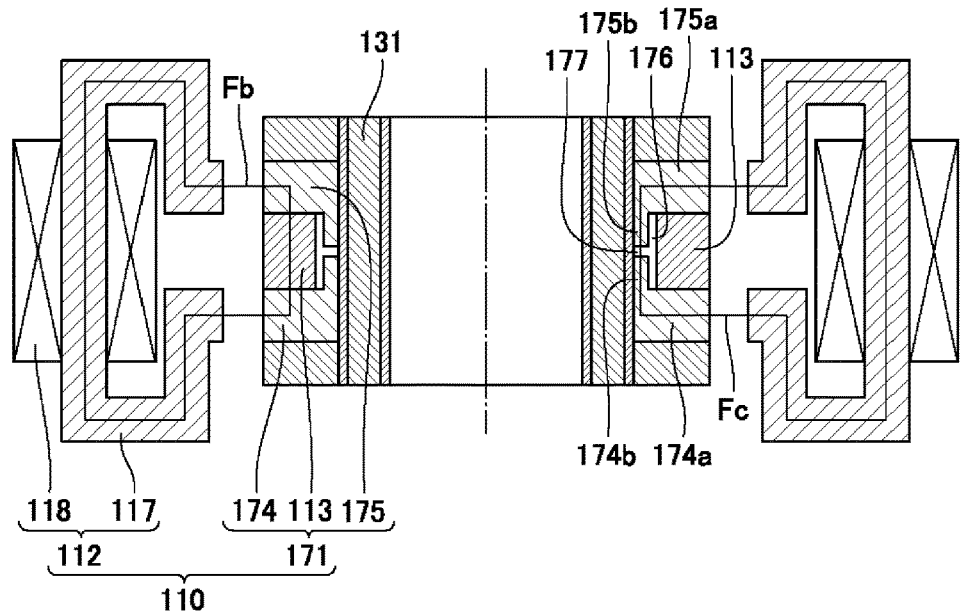
FIG. 7 is a longitudinal sectional view showing schematically a magnetic bearing of same pump.

FIG. 6 is a longitudinal sectional view showing schematically an overall configuration of a pump 100C according to a fourth embodiment of the present invention, with part of the overall configuration omitted. FIG. 7 is a longitudinal sectional view showing schematically the magnetic bearing 110 of the pump 100C.

As shown in FIG. 6, the pump 100C according to the fourth embodiment is similar to the pump 100 of the first embodiment in having the magnetic bearing 110, but differs from the pump 100 of the first embodiment in that configuration of a bearing rotor member 171 of this magnetic bearing 110 differs from configuration of the bearing rotor member 111.

That is, the bearing rotor member 171 has, for example: the permanent magnet 113 which is circular annularly-shaped; and a pair of yokes 174, 175 which are circular annularly-shaped and disposed concentrically with this permanent magnet 113 so as to sandwich the permanent magnet 113 in the axial direction (Z axis direction). The pair of yokes 174, 175 form substantially a U shape with its bearing stator member 112 side configured as an open end and its center in the Z axis direction severed.

Specifically, as shown in FIG. 7, a longitudinal sectional shape of the pair of yokes 174, 175 has: fourth portions 174a, 175a that extend in a second direction (here, the radial direction) orthogonal to the Z axis direction, so as to cover end surfaces on a first direction (here, a Z axis direction) side of the permanent magnet 113; and a pair of fifth portions 174b, 175b that extend in an orientation of approaching each other in the Z axis direction from end portions on a side distant from the bearing stator member 112 in the radial direction of the fourth portions 174a, 175a, so as to form a first gap 176 between themselves and an end surface on the side distant from the bearing stator member 112 in the radial direction of the permanent magnet 113, and each of tip portions of these pair of fifth portions 174b, 175b are formed in a shape of being separated from each other so as to form a second gap 177 communicating with the first gap 176.

In the case of there being such a shape, a magnetic circuit of a bias magnetic flux Fb due to the permanent magnet 113 stabilizes, and it becomes possible for a control magnetic flux Fc generated by the coil 118 to be passed through the bearing rotor member 171 with loss reduced to the utmost. Hence, while the magnetic bearing 110 may be configured combined with a general bearing stator member having a U-shaped core, by configuring it combined specifically with the bearing stator member 112 according to the present embodiment having the first through third portions 117a-117c, it becomes possible for rotational control of the rotor 120 appropriate to operation conditions of the pump 100C to be accurately performed, and so on.

Fifth Embodiment

[Yet Another Configuration of Pump]

Figure 8:
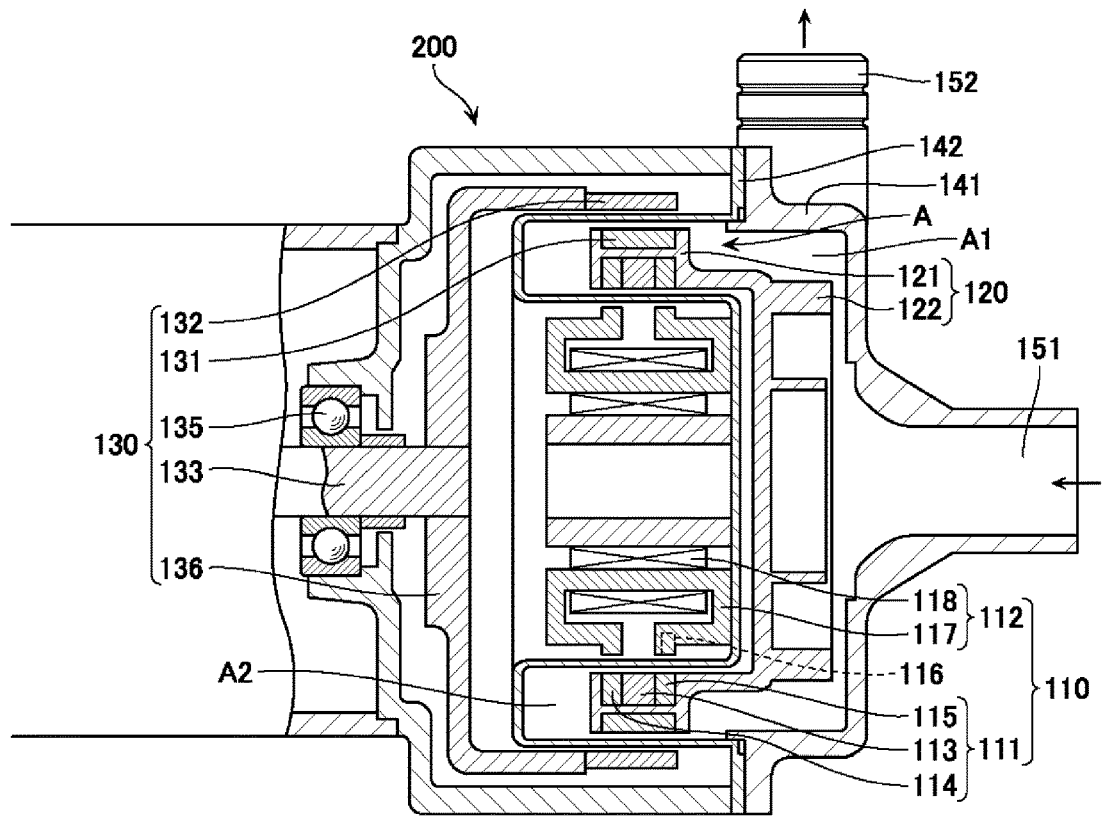
FIG. 8 is a longitudinal sectional view showing schematically an overall configuration of a pump according to a fifth embodiment of the present invention, with part of the overall configuration omitted.

FIG. 8 is a longitudinal sectional view showing schematically an overall configuration of a pump 200 according to a fifth embodiment of the present invention, with part of the overall configuration omitted.

As shown in FIG. 8, the pump 200 according to the fifth embodiment differs from the pump 100 of the first embodiment in that disposition state of its magnetic bearing 110 and drive structure of its drive mechanism 130 differ from those of the pump 100 of the first embodiment. That is, whereas in the pump 100 of the first embodiment, the drive magnet 132, the driven magnet 131, the bearing rotor member 111, and the bearing stator member 112 were disposed in this order outwardly in the radial direction from an axial center of the motor shaft 133, in the pump 200 of the fifth embodiment, these configurations have their order of disposition outwardly from the axial center of the motor shaft 133 reversed.

In other words, a configuration is adopted such that the bearing/driven portion 121 of the rotor 120 is supported by the magnetic bearing 110 from an inner side of the annular space A2, and the impeller 122 is rotated by the bearing/driven portion 121 being driven by the drive magnet 132 on a tip side of a drive cylinder portion 136 attached to a tip of the motor shaft 133 from an outer side of this annular space A2, that is, a configuration is adopted in which the magnetic bearing 110, the driven magnet 131, and the drive magnet 132 are disposed in this order outwardly from the axial center. By the impeller 122 being thus driven from the outer side of the annular space A2, it becomes possible for the impeller 122 to be rotated by a larger torque, compared to in a configuration where drive is implemented from the inner side of the annular space A2 as in the pump 100 of the first embodiment.

Sixth Embodiment

[Yet Another Configuration of Pump]

Figure 9:
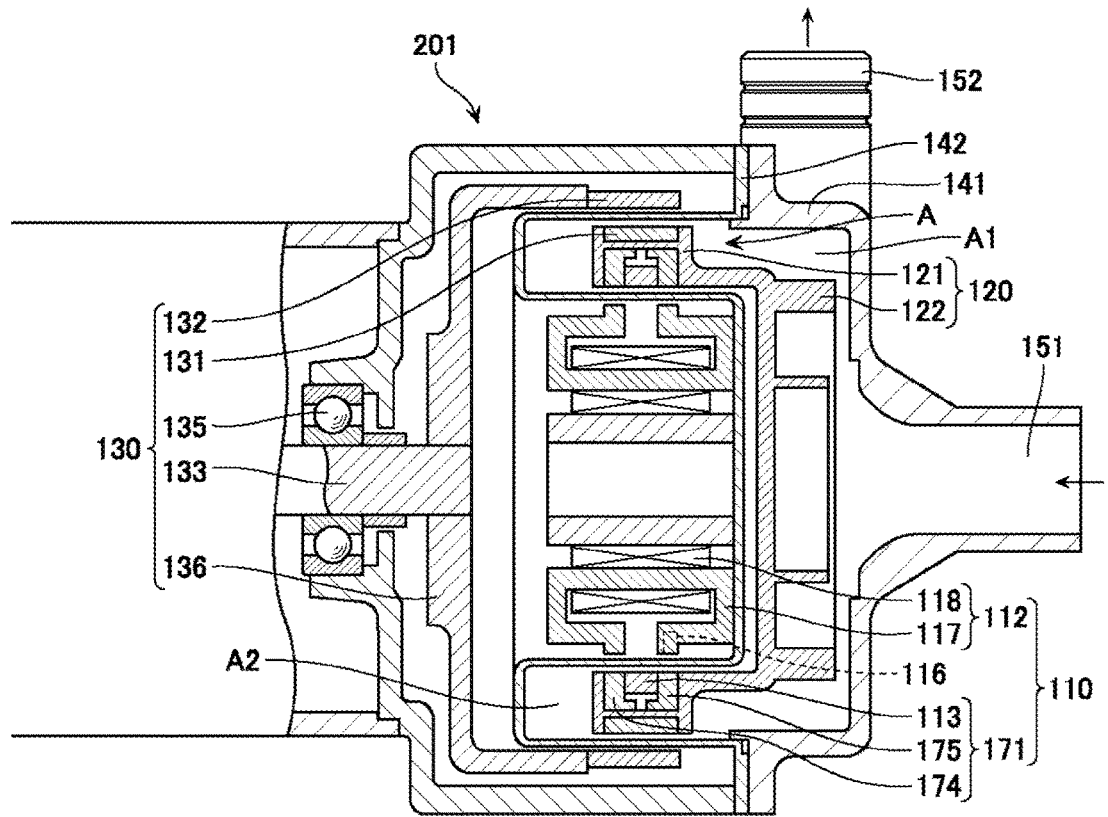
FIG. 9 is a longitudinal sectional view showing schematically an overall configuration of a pump according to a sixth embodiment of the present invention, with part of the overall configuration omitted.

FIG. 9 is a longitudinal sectional view showing schematically an overall configuration of a pump 201 according to a sixth embodiment of the present invention, with part of the overall configuration omitted.

As shown in FIG. 9, the pump 201 according to the sixth embodiment differs from the pump 100C of the fourth embodiment in having the configuration of the pump 100C of the fourth embodiment configured so that, in the same way as in the pump 200 of the fifth embodiment, the magnetic bearing 110, the driven magnet 131, and the drive magnet 132 are disposed outwardly in the radial direction from the axial center of the motor shaft 133 and the impeller 122 is driven from the outer side of the annular space A2. Such a configuration enables the impeller 122 to be rotated by a larger torque than when driven from the inner side of the annular space A2, and enables rotational control of the rotor 120 appropriate to operation conditions of the pump 201 to be accurately performed.

Seventh Embodiment

[Another Configuration of Pump]

Figure 10:
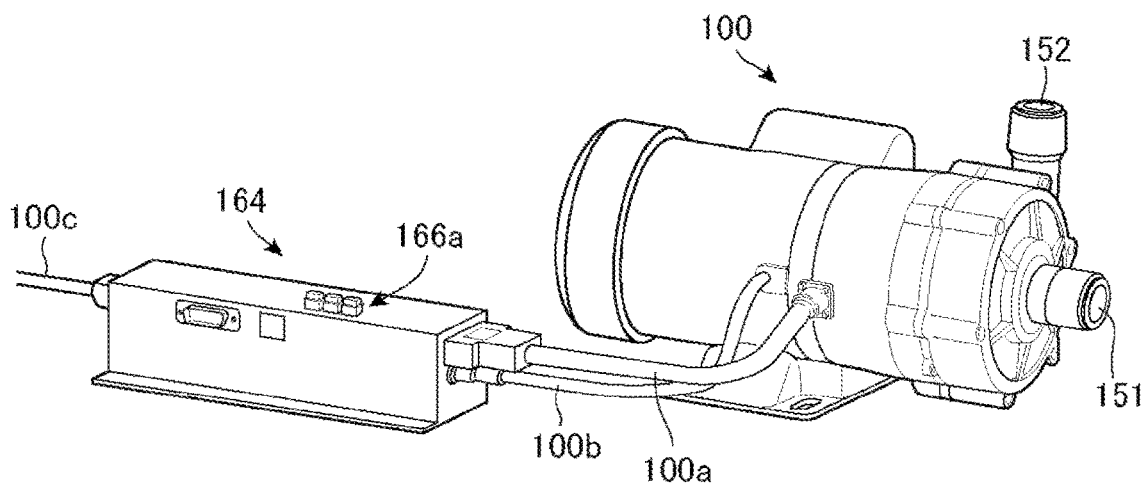
FIG. 10 is a perspective view showing schematically an overall configuration of a pump according to a seventh embodiment of the present invention.
Figure 11:
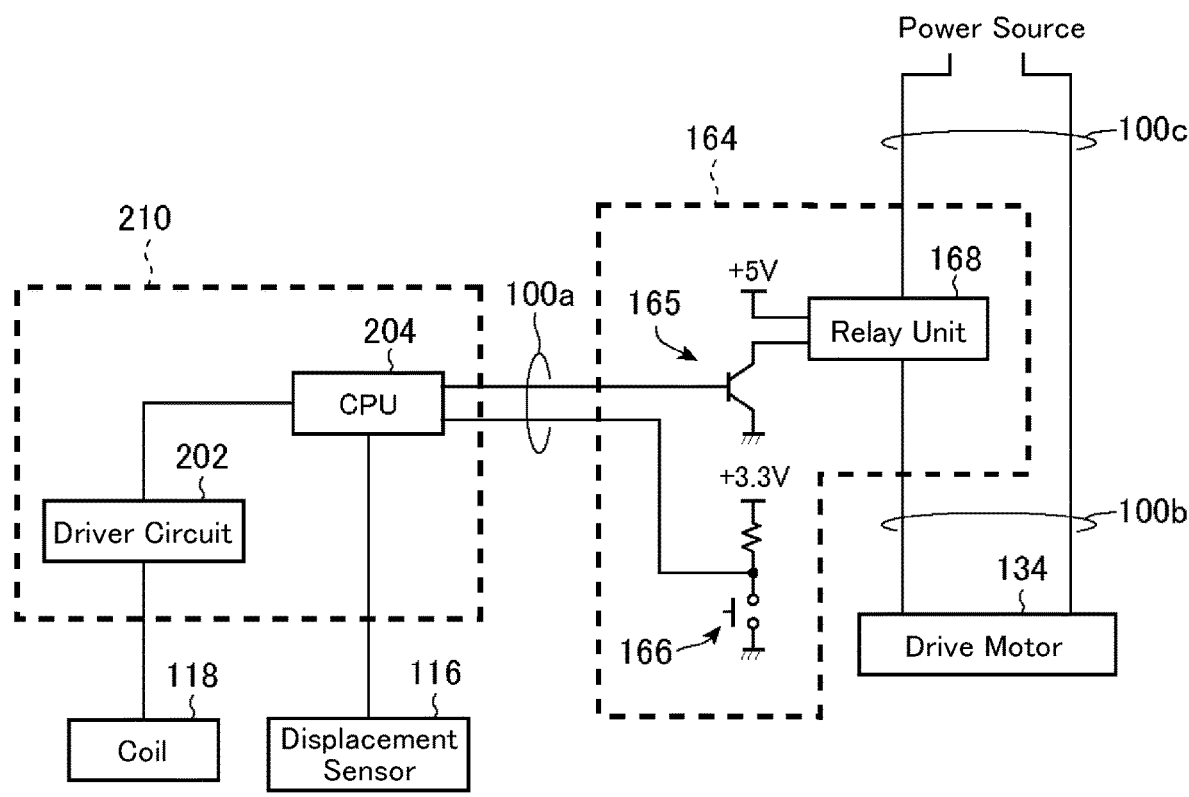
FIG. 11 is a block diagram showing a circuit configuration of same pump.

FIG. 10 is a perspective view showing schematically an overall configuration of a pump 100 according to a seventh embodiment of the present invention; and FIG. 11 is a block diagram showing a circuit configuration of the pump 100. Note that although illustration and description thereof will be omitted, it goes without saying that the configuration of the present embodiment can also be applied to the pumps 100, 100A-100C, 200, and 201 of the first through sixth embodiments.

As shown in FIG. 10, the pump 100 of the seventh embodiment has connected to a drive motor stopping device 164, which is connected to a power source line 100c, via a signal line 100a and a power supply line 100b, for example. The drive motor stopping device 164, which along with a controller 210 configures a control unit, has a function (a stopping function) of stopping operation of the drive motor 134 when an abnormality has occurred in the magnetic bearing 110 of the pump 100, for example.

That is, in this kind of pump 100, if the magnetic bearing 110 and the drive motor 134 are separately controlled, it will result in the drive motor 134 continuing to operate even when by some chance contactless support (magnetic flotation) of the rotor 120 by the magnetic bearing 110 has collapsed. Moreover, in such a case, it may happen that the rotor 120 rubs against the rear casing 142, or the like, or the impeller 122 of the rotor 120 rubs against the front casing 141, or the like, and thereby ends up breaking.

Accordingly, in the present embodiment, a configuration has been adopted whereby, based on information expressing a state of the magnetic bearing 110 including the detection signal of the likes of the displacement sensor 116 from the magnetic bearing 110 side, an abnormality of the magnetic bearing 110 is judged by the controller 210, and, based on a judgment result, the drive motor stopping device 164 is activated, whereby, for example, power supply to the drive motor 134 by the power supply line 100b is cut off and operation of the drive motor 134 thereby stopped. This makes it possible to effectively prevent destruction of the likes of the impeller 122 or rotor 120 or of the rear casing 142 that may happen when an abnormality of the magnetic bearing 110 has occurred.

As shown in FIG. 11, the drive motor stopping device 164 includes therein a transistor 165, a manually-operated switch 166, and a relay unit 168, for example. The transistor 165 drives the relay unit 168 by control from the controller 210. Moreover, a switch button 166a of the manually-operated switch 166 is exposed to outside of a casing (refer to FIG. 10). The relay unit 168 may be configured by a solid-state relay (SSR) or mechanical relay.

The drive motor stopping device 164 is connected, via the signal line 100a, to the controller 210 which is provided within the pump 100. The controller 210 includes: a driver circuit 202 that drives the coil 118 of the magnetic bearing 110; and a CPU 204 that controls the driver circuit 202 based on output of the displacement sensor 116.

The pump 100 according to the present embodiment configured in this way operates as follows, for example. Specifically, when the detection signal from the displacement sensor including the likes of the displacement sensor 116 inputted to the CPU 204 has indicated an abnormal value, the CPU 204 judges there to be an abnormality in magnetic flotation, and raises the signal line 100a from L level to H level (an abnormality signal). As a result, the transistor 165 in the drive motor stopping device 164 attains an ON state, and the relay unit 168 cuts off the power source line 100c and the power supply line 100b to block power supply by the power supply line 100b to the drive motor 134. Thereby, operation of the drive motor 134 is stopped.

Similarly, in the likes of the following cases too such as when, for example, coil temperature has indicated an abnormal value due to a detection signal from a temperature sensor (not illustrated) detecting temperature of the coil 118, or a value of coil current flowing in the coil 118 has indicated an abnormal value, or when temperature of the driver circuit 202 has indicated an abnormal value, the CPU 204 judges there to be an abnormality in magnetic flotation, and thereby sends the abnormality signal to the drive motor stopping device 164. As a result, the drive motor stopping device 164 performs cutoff by the relay unit 168 and stops operation of the drive motor 134.

Moreover, when, for example, detection signals indicating rotational speeds of the driven magnet 131 and the drive magnet 132 like the above-mentioned detection signals from the detector elements 161, 162 (refer to FIG. 4) have indicated abnormal values (values of the rotational speeds differing), the CPU 204 judges there to have occurred step-out of the above-mentioned kind, and may similarly stop the drive motor 134. Note that operation of the drive motor 134 may also be stopped by, for example, operating the switch button 166a of the manually-operated switch 166. In this case, a configuration may be adopted such that, by an operation signal of the manually-operated switch 166 being sent to the CPU 204 of the pump 100, the transistor 165 is set to an ON state from the CPU 204. As a result, a stopped state of the drive motor 134 can be grasped by the CPU 204 too, and other control ceases to be affected. Due to such a configuration, operational advantages similar to operational advantages of the above-described first through sixth embodiments can be displayed, and damage of the impeller 122 or rotor 120, the rear casing 142, or an outer cover 233 of a housing portion 230 of a later-mentioned rotor 120, and so on, when an abnormality of the magnetic bearing 110 has occurred, can be effectively prevented.

Eighth Embodiment

[Another Configuration of Pump]

Figure 12:
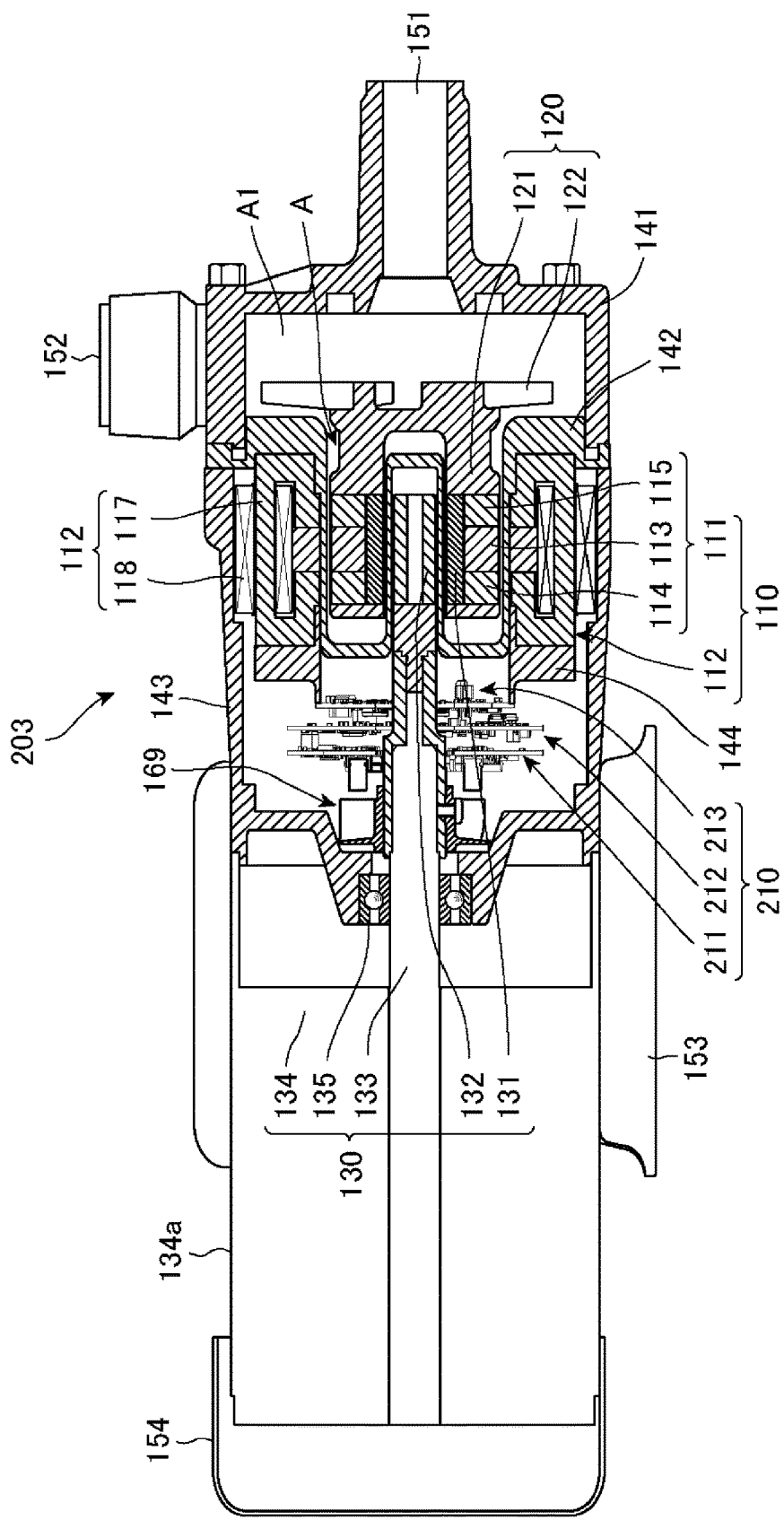
FIG. 12 is a longitudinal sectional view showing schematically an overall configuration of a pump according to an eighth embodiment of the present invention, with part of the overall configuration omitted.

FIG. 12 is a longitudinal sectional view showing schematically an overall configuration of a pump 203 according to an eighth embodiment of the present invention, with part of the overall configuration omitted. Note that this pump 203 can also be applied to the pump 100 shown in FIGS. 10 and 11.

As shown in FIG. 12, the pump 203 according to the eighth embodiment differs from the pump 100 according to the first embodiment, for example, in that the controller 210 controlling the pump mechanism is disposed on a rear side of the yoke base 144, in that the motor shaft 133 of the drive motor 134 on a rear side of this controller 210 has attached to it a cooling fan 169 acting as a rotating blade, and in that the controller 210 and the cooling fan 169 are disposed on an inside of the bracket 143.

The controller 210 includes, for example: a driver board 211 that drives the coil 118 of the magnetic bearing 110; a CPU board 212 that controls drive operation of the drive mechanism 130; and an encoder board 213 that controls an unillustrated magnetic encoder, or the like. Note that a motor housing 134a connected to the bracket 143 has a rear cover 154 attached to its rear side, and, along with the bracket 143, is disposed on a pump base 153.

In the above-described configuration, the controller 210 comprises a characteristic of being prone to generate heat. In particular, an amount of heat generated by the likes of a MOS-FET used as the driver circuit 202 (refer to FIG. 11) in the driver board 211 is large.

In this respect, the pump 203 of the present embodiment results in that due to the cooling fan 169 being attached to the motor shaft 133, the cooling fan 169 rotates together with the motor shaft 133. Therefore, it is possible for the controller 210 to be always continuously cooled during operation of the pump 203, and a malfunction such as thermal runaway of each of the boards 211-213 accompanying heat generation can be effectively prevented. In particular, the driver board 211 whose generated heat amount is largest experiences the highest cooling effect due to being disposed at a position closest to the cooling fan 169. Moreover, due to there being no need for there to be separately installed the likes of a fan motor for rotating the cooling fan 169, the present embodiment makes it possible for the number of components configuring the pump 203 to be kept to a minimum while the likes of space for cooling and costs are suppressed.

Note that if the bracket 143 has unillustrated ventilating holes formed therein, the cooling effect further increases. Due to such a configuration, operational advantages similar to operational advantages of the first embodiment, and so on, can be displayed, and there can be configured a pump 203 that, even though having disposed on its inside a heat generating source or heat generating body such as the controller 210, is capable of effectively preventing a malfunction due to generated heat of the controller 210.

Ninth Embodiment

[Another Configuration of Rotor of Pump]

Figure 13:
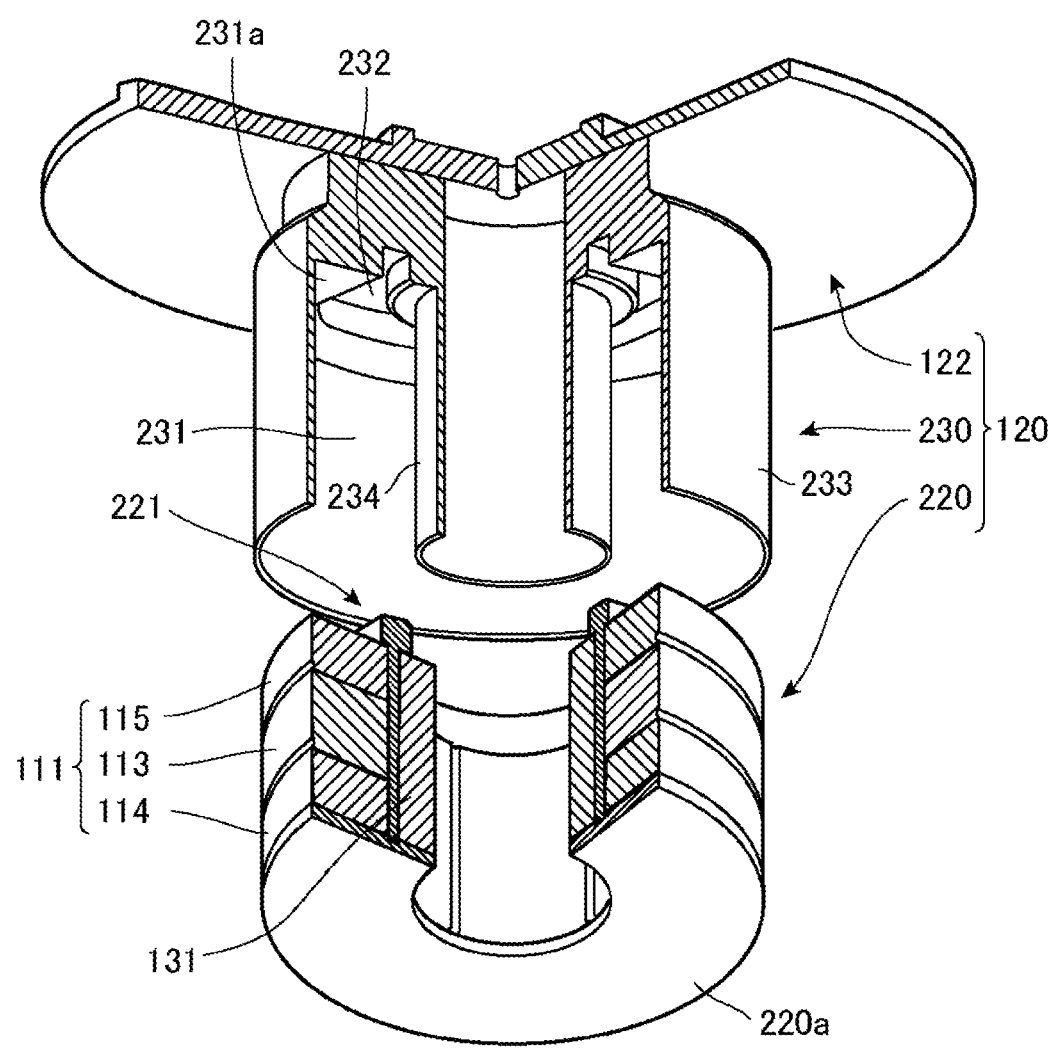
FIG. 13 is a perspective view showing schematically an overall configuration of a rotor of a pump according to a ninth embodiment of the present invention, with part of the overall configuration cut out.
Figure 14:
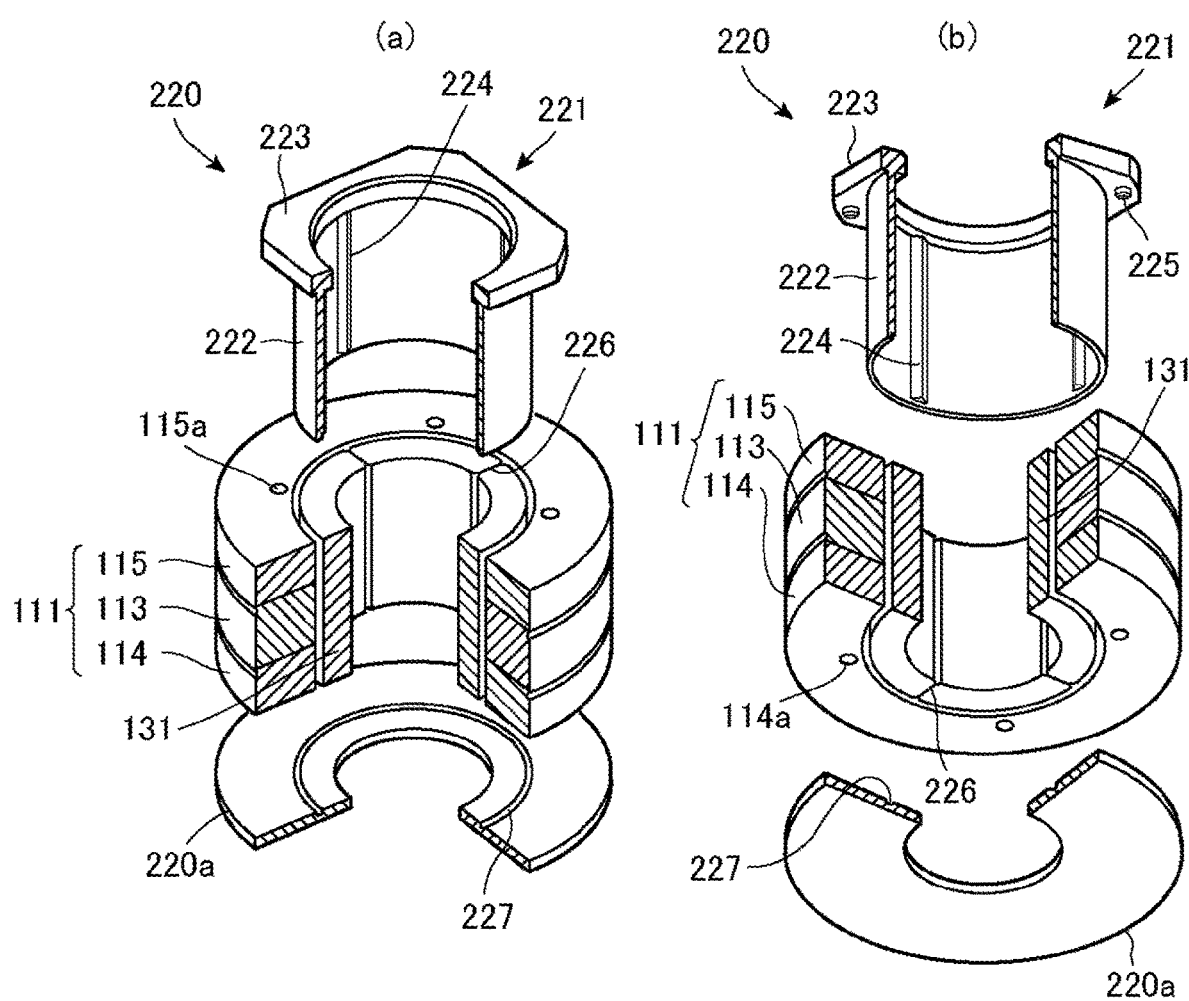
FIG. 14 is an exploded perspective view showing schematically an overall configuration of a bearing/driven assembly included in same pump, with part of the overall configuration cut out.
Figure 15:
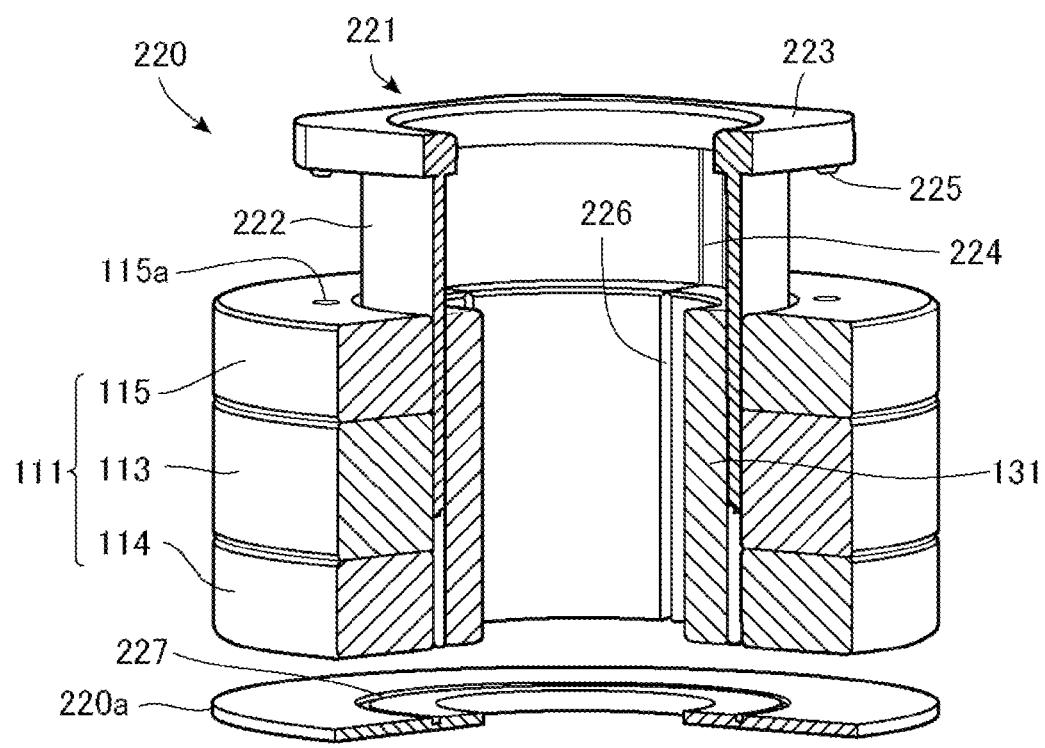
FIG. 15 is an exploded perspective view showing schematically an overall configuration of same bearing/driven assembly, with part of the overall configuration cut out.

FIG. 13 is a perspective view showing schematically an overall configuration of the rotor 120 of a pump according to a ninth embodiment of the present invention, with part of the overall configuration cut out; and FIGS. 14 and 15 are exploded perspective views each showing schematically an overall configuration of a bearing/driven assembly 220 included in the rotor 120, with part of the overall configuration cut out. Note that FIG. 14(a) is an exploded perspective view from above, and FIG. 14(b) is an exploded perspective view from below.

As shown in FIGS. 13 to 15, for the purpose of for example preventing slip of the permanent magnet 113 and driven magnet 131 by which the rotor 120 in the pump of the ninth embodiment is configured, it has these fixed to it without any adhesive material being used, instead of having them fixed to it by adhesion.

Specifically, the rotor 120 is formed having: the impeller 122; the bearing/driven assembly 220 of circular annular shape corresponding to the bearing/driven portion; and the housing portion 230 which is formed from a resin molded member capable of housing the bearing/driven assembly 220 on its inside, on the rear side of the impeller 122. The housing portion 230 has: the outer cover 233 that covers an outer peripheral surface of the bearing/driven assembly 220; and an inner cover 234 that covers an inner peripheral surface of the bearing/driven assembly 220. The outer cover 233 and the inner cover 234, which are coaxially disposed, have formed between them a main housing chamber 231 that houses the circular annularly-shaped bearing/driven assembly 220. An upper wall surface 231a on an impeller 122 side of this main housing chamber 231 has formed therein a concave engaging portion 232.

On the other hand, the bearing/driven assembly 220 has: the bearing rotor member 111 which has the above-mentioned kinds of permanent magnet 113 and pair of yokes 114, 115; the driven magnet 131 which is disposed on the inner side in the radial direction of this bearing rotor member 111; and a middle ring 221 formed from a resin molded member acting as a rotation restricting member that couples these bearing rotor member 111 and driven magnet 131 in a manner rendering them incapable of slip.

Note that the driven magnet 131 is here configured by a plurality of (for example, four polar) permanent magnets that have been magnetized in a radial direction of the rotor 120 in such a manner that their N poles and S poles are disposed alternately in the peripheral direction of the rotor 120. The middle ring 221 has: a cylindrical portion 222 which is inserted in an interposing manner between the bearing rotor member 111 and the driven magnets 131; and a flange portion 223 that abuts on an end surface in the first direction of the bearing rotor member 111 (for example, an end surface of the yoke 115), and whose shape when viewed from an axial direction (the Z axis direction) has an outer shape other than a perfectly circular shape (for example, an outer shape in the shape of a rectangle whose corners have been cut out).

Note that as shown in FIGS. 14(a) and 14(b), end surfaces on outer sides in the Z axis direction of the yokes 114, 115 have formed therein recess portions 114a, 115a. Moreover, the end surface on an opposite side to aside abutting on the flange portion 223, of these end surfaces (here, the end surface on a yoke 114 side) has attached thereto a resin-made end plate 220a formed from the likes of a heat insulating material, for example. On an end surface on a side facing the yoke 114, for example, of this endplate 220a, there may be formed a projection portion (illustration of which is omitted) that fits into the recess portion 114a.

The driven magnets 131, at least corners of ridge lines extending in the rotational axis direction of joining portions of each of which are chamfered, have formed at each of their joining portions in the peripheral direction a V-shaped groove 226 that extends in the rotational axis direction due to chamfering. An inner peripheral surface of the cylindrical portion 222 of the middle ring 221 has formed thereon a V-shaped claw portion 224 that catches on the groove 226 formed at the joining portions in the peripheral direction of the driven magnets 131. Moreover, an abutting surface with the end surface of the bearing rotor member 111 of the flange portion 223 of the middle ring 221 has formed thereon a projection portion 225 that engages with the recess portion 115a provided in the end surface of the yoke 115, for example. Moreover, the concave engaging portion 232 formed in the upper wall surface 231a of the main housing chamber 231 is formed in a shape matching the outer shape of the flange portion 223 of the middle ring 221. Moreover, a surface facing the middle ring 221 of the end plate 220a has formed therein an annular groove 227 into which an end portion on an opposite side to the flange portion 223 of the cylindrical portion 222 of the middle ring 221 fits.

In the bearing/driven assembly 220 configured in this way, the claw portions 224 in the cylindrical portion 222 of the middle ring 221 catch on the grooves 226, and the projection portions 225 of the flange portion 223 of the middle ring 221 engage with the recess portions 115a of the yoke 115, whereby slip in the peripheral direction of the driven magnets 131 with respect to the bearing rotor member 111 is prevented.

Thus, the bearing rotor member 111 and the driven magnets 131 are fixed to each other in a manner rendering them incapable of slip, by the middle ring 221. Note that an end portion of the cylindrical portion 222 on an opposite side to the flange portion 223 of the middle ring 221 is firmly fitted into the groove 227 formed in the end plate 220a, by the likes of press fitting. Thereby, the bearing/driven assembly 220 is assembled.

Note that in the above-described embodiment, a configuration may be adopted whereby the end plate 220a is coupled to the middle ring 221, outer cover 223, and inner cover 234 by the likes of ultrasonic welding or hot plate welding, for example, instead of or in addition to coupling by press fitting to the middle ring 221. Thereby, the end plate 220a is more firmly fixed to the rotor 120. Moreover, the end plate 220a may have a projection portion fitting into the recess portion 114a of the yoke 114. In this case, not only the yoke 115 but also the yoke 114 has its movement in the peripheral direction restricted.

Moreover, by the bearing/driven assembly 220 in such a state being inserted in the housing portion 230, and the flange portion 223 of the middle ring 221 being firmly engaged by press fitting, or the like, with the engaging portion 232 of the housing portion 230, the rotor 120 is formed in a state where slip in the peripheral direction of the bearing/driven assembly 220 with respect to the rotor 120 is also prevented. As a result, rotation in the peripheral direction of the yoke 115 with respect to the rotor 120 is also prevented, so rotation in the peripheral direction of the permanent magnet 113 firmly fixed by magnetic force to the rotor 120 is also prevented.

Thus, due to the ninth embodiment, operational advantages similar to operational advantages of the first embodiment, and so on, can be displayed, and the permanent magnet 113 and driven magnets 131 can be fixed to the rotor 120 without relying on adhesion. Therefore, slip of the bearing rotor member 111 or driven magnets 131 caused by an adhesion-related malfunction such as an adhesive agent melting due to a corrosive gas, for example, can be certainly prevented, and it becomes possible for factors in occurrence of a rotational malfunction of the rotor 120 to be reduced.

Note that a structure preventing slip in the peripheral direction of the bearing rotor member 111 and driven magnets 131 with respect to the middle ring 221 is not limited to the above-mentioned example. For example, the joining portions of the driven magnets 131 may be provided with a gap, and the middle ring 221 have formed therein a projecting strip that fits into this gap. Moreover, a configuration may be adopted whereby the ridge line extending in the radial direction of the joining portions of the driven magnets 131 is chamfered, and a projecting strip fitting into a thereby-formed V groove extending in the radial direction is formed in the middle ring 221. Furthermore, a configuration may be adopted whereby the claw portion 224 or a projecting strip formed in the middle ring 221 is provided on an outer peripheral surface side of the cylindrical portion 222 in the fifth embodiment shown in FIG. 8. In short, if the bearing rotor member 111 and the driven member (the driven magnets 131) are coupled via the rotation restricting member exemplified by the middle ring 221, whereby there is undergone a restriction in their rotational direction with respect to each other and a restriction in the rotational direction with respect to the rotor 120 of the two, then there will cease to be a need for an adhesive agent to be used.

Moreover, as a modified example of the present embodiment (illustration of which is however omitted), there may be adopted a configuration where, for example, the bearing/driven portion 121 of the rotor 120 is first formed, and this bearing/driven portion 121 has the impeller 122 manufactured onto it by secondary molding. In this case, the rotor 120 is manufactured as follows, for example. First, the bearing/driven assembly 220 is manufactured. During manufacture of the bearing/driven assembly 220, first, the middle ring 221 is formed by mold molding, for example, and, while the molding-completed middle ring 221 is hot (when the molding-completed middle ring 221 is at a certain temperature or more), the driven magnet 131 is inserted into the inner side (the inner peripheral surface side) of the cylindrical portion 222 of the middle ring 221. Then, cooling-induced contraction of the middle ring 221 is utilized to fix the driven magnet 131 in the middle ring 221.

Next, the bearing rotor member 111 is positioned on the outer side (the outer peripheral surface side) of the cylindrical portion 222 of the middle ring 221 in such a manner that the recess portion 115a of the yoke 115 fits into the projection portion 225 of the flange portion 223, for example, whereby the bearing rotor member 111 engages with said cylindrical portion 222, and the bearing/driven assembly 220 is formed. Subsequently, mold molding is similarly used to form the lidded cylindrical housing portion (a rotor case) 230 that includes the outer cover 233 and inner cover 234 and is configured having a lid on one side in the Z axis direction of the main housing chamber 231.

Then, while the molding-completed housing portion 230 is hot (when the molding-completed housing portion 230 is at a certain temperature or more), the bearing/driven assembly 220 is inserted into the main housing chamber 231 in such a manner that the flange portion 223 of the middle ring 221 is engaged with the engaging portion 232 of the housing portion 230, and cooling-induced contraction of the housing portion 230 is utilized to fix the bearing/driven assembly 220 in the main housing chamber 231.

Subsequently, by the end plate 220a being inserted from an opening end side of the main housing chamber 231 of the housing portion 230 in such a manner that an unillustrated projection portion fits into the recess portion 114a, for example, and, furthermore, by the opening end side of the main housing chamber 231 undergoing resin molding whereby an unillustrated lid portion is formed, and by the main housing chamber 231 being sealed, the housing portion 230 is manufactured. The endplate 220a made from the heat insulating material being inserted at this time is in order to prevent that heat at a time of molding is transmitted to the permanent magnet 113 and driven magnets 131 whereby these magnets end up demagnetizing. Finally, the impeller 122 is formed so as to be joined to the housing portion 230, by secondary molding, and the rotor 120 is completed. Configuring in this way makes it possible for variations in combination of the impeller 122 in the rotor 120 and the housing portion 230 to be more simply increased.

Note that in the ninth embodiment, a configuration was adopted whereby the projection portion 225 is formed in the flange portion 223 of the middle ring 221 to be engaged with the recess portion 115a of the yoke 115. However, a configuration may be adopted whereby, instead of this projection portion 225, a separately manufactured pin member (illustration of which is omitted) that fits into the recess portion 115a is inserted in a hole portion (illustration of which is omitted) provided in the flange portion 223 at a time of molding of the middle ring 221, and cooling-induced contraction utilized to fix the pin member in the flange portion 223.

While certain embodiments have been described, these embodiments have been presented by way of example only, and are not intended to limit the scope of the inventions. Indeed, the novel methods and systems described herein may be embodied in a variety of other forms: furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

DESCRIPTION OF REFERENCE NUMERALS 100 pump
110 magnetic bearing
111 bearing rotor member
112 bearing stator member
113 permanent magnet
114, 115 yoke
116 displacement sensor
117 core
118 coil 120 rotor
121 bearing/driven portion
122 impeller
130 drive mechanism
131 driven magnet
132 drive magnet
133 motor shaft
134 drive motor
135 bearing

The invention claimed is:

1. A pump comprising:
a rotor;
a magnetic bearing that supports the rotor by a magnetic force;
a drive mechanism that rotationally drives the rotor;
a pump mechanism including an impeller which is attached to the rotor; and
a control unit that controls the magnetic bearing,
the magnetic bearing comprising:
a bearing rotor member formed from a magnetic material and provided in the rotor; and
a bearing stator member disposed so as to face the bearing rotor member, the bearing stator member having:
a core formed from a magnetic material; and
a coil wound around the core,
the drive mechanism comprising:
a driven member provided adjacently in a radial direction to the bearing rotor member in the rotor; and
a drive portion that is disposed facing the driven member in the radial direction, and is magnetically coupled to the driven member to drive the rotor, and
the control unit correcting rotational position of the rotor based on a detection signal from a first sensor portion provided so as to be capable of detecting displacement of the rotor, wherein
the core of the bearing stator member is formed in such a manner that its longitudinal sectional shape has:
a first portion which extends in a first direction orthogonal to a direction of facing the bearing rotor member, and around which the coil is wound;
a pair of second portions that extend to a bearing rotor member side from both end portions in the first direction of the first portion, and then extend in an orientation of approaching each other in the first direction; and
a pair of third portions that extend toward the bearing rotor member side from each of tip portions of the pair of second portions, and
a length in the first direction of the coil wound around the first portion is greater than a distance between opposed surfaces in the first direction of the pair of third portions.

2. The pump according to claim 1, wherein
the drive portion is disposed on an inner side in the radial direction of the driven member, and
a plurality of the bearing stator members are disposed on an outer side in the radial direction of the bearing rotor member, and each face the bearing rotor member in the radial direction.

3. The pump according to claim 1, wherein
the drive portion is disposed on an outer side in the radial direction of the driven member, and
a plurality of the bearing stator members are disposed on an inner side in the radial direction of the bearing rotor member, and each face the bearing rotor member in the radial direction.

4. The pump according to claim 1, further comprising:
a second sensor portion that detects rotational speed of a drive motor rotationally actuating the drive portion; and
a third sensor portion that detects rotational speed of the rotor,
wherein the control unit corrects rotational synchronization of the drive motor and the rotor based on detection signals from the second and third sensor portions.

5. The pump according to claim 2, further comprising:
a second sensor portion that detects rotational speed of a drive motor rotationally actuating the drive portion; and
a third sensor portion that detects rotational speed of the rotor,
wherein the control unit corrects rotational synchronization of the drive motor and the rotor based on detection signals from the second and third sensor portions.

6. The pump according to claim 3, further comprising:
a second sensor portion that detects rotational speed of a drive motor rotationally actuating the drive portion; and
a third sensor portion that detects rotational speed of the rotor,
wherein the control unit corrects rotational synchronization of the drive motor and the rotor based on detection signals from the second and third sensor portions.

7. The pump according to claim 1, wherein
the pump mechanism comprises:
a casing that forms a housing space for housing the rotor; and
an auxiliary member which is provided in a portion on an opposite side in an axial direction to the housing space of the casing, and that attracts the rotor by a certain magnetic force.

8. The pump according to claim 1, wherein
the rotor has:
a bearing/driven assembly formed by integrally fixing the bearing rotor member and the driven member; and
a housing portion capable of housing the bearing/driven assembly on its inside in a state that movement has been restricted in a rotational direction, and
the bearing/driven assembly has: the bearing rotor member; the driven member disposed on an inner side or outer side in the radial direction of the bearing rotor member; and a rotation restricting member that couples the bearing rotor member and the driven member in a state that their movement in the rotational direction with respect to each other has been restricted.

9. The pump according to claim 8, wherein
the bearing rotor member has:
an annular permanent magnet; and
a pair of annular yokes disposed so as to sandwich the permanent magnet in the first direction,
the driven member has a plurality of permanent magnets that are magnetized in the radial direction so that their N poles and S poles are disposed alternately in a peripheral direction of the rotor,
the rotation restricting member includes: a cylindrical portion inserted in an interposing manner between the bearing rotor member and the driven member; and a flange portion that abuts on an end surface in the first direction of the bearing rotor member, and whose shape viewed in an axial direction has an outer shape other than a perfectly circular shape,
the rotation restricting member has formed on an inner peripheral surface or outer peripheral surface of the cylindrical portion, claw portions that catch on edge portions at boundaries in the peripheral direction of the plurality of permanent magnets of the driven member, the rotation restricting member has formed on an abutting surface with the end surface of the bearing rotor member of the flange portion, a projection portion that engages with a recess portion provided in the end surface, and the housing portion has an engaging portion which is formed in a shape matching the outer shape of the flange portion.

10. The pump according to claim 1, wherein
the control unit judges an abnormality of the magnetic bearing based on information expressing a state of the magnetic bearing including the detection signals, and stops operation of the drive mechanism based on a judgment result.

11. The pump according to claim 4, further comprising:
a rotating blade attached to a rotating shaft of the drive motor to rotate along with the rotating shaft; and
a driver board which is disposed at a position facing the rotating blade in an axial direction of the rotating shaft, and that drives the coil of the magnetic bearing.

12. A pump comprising:
a rotor;
a magnetic bearing that supports the rotor by a magnetic force;
a drive mechanism that rotationally drives the rotor;
a pump mechanism including an impeller which is attached to the rotor; and
a control unit that controls the magnetic bearing,
the magnetic bearing comprising:
a bearing rotor member formed from a magnetic material and provided in the rotor; and
a bearing stator member disposed so as to face the bearing rotor member,
the bearing stator member having:
a core formed from a magnetic material; and
a coil wound around the core,
the drive mechanism comprising:
a driven member provided adjacently in a radial direction to the bearing rotor member in the rotor; and
a drive portion that is disposed facing the driven member in the radial direction, and is magnetically coupled to the driven member to drive the rotor, and
the control unit correcting rotational position of the rotor based on a detection signal from a first sensor portion provided so as to be capable of detecting displacement of the rotor, wherein
the core of the bearing stator member is formed in such a manner that its longitudinal sectional shape has:
a first portion which extends in a first direction orthogonal to a direction of facing the bearing rotor member, and around which the coil is wound;
a pair of second portions that extend to a bearing rotor member side from both end portions in the first direction of the first portion, and then extend in an orientation of approaching each other in the first direction; and
a pair of third portions that extend toward the bearing rotor member side from each of tip portions of the pair of second portions;
the drive portion is disposed on an outer side in the radial direction of the driven member; and
a plurality of the bearing stator members are disposed on an inner side in the radial direction of the bearing rotor member, and each face the bearing rotor member in the radial direction.

13. A pump comprising:
a rotor;
a magnetic bearing that supports the rotor by a magnetic force;
a drive mechanism that rotationally drives the rotor;
a pump mechanism including an impeller which is attached to the rotor; and
a control unit that controls the magnetic bearing,
the magnetic bearing comprising:
a bearing rotor member formed from a magnetic material and provided in the rotor; and
a bearing stator member disposed so as to face the bearing rotor member,
the bearing stator member having:
a core formed from a magnetic material; and
a coil wound around the core,
the drive mechanism comprising:
a driven member provided adjacently in a radial direction to the bearing rotor member in the rotor; and
a drive portion that is disposed facing the driven member in the radial direction, and is magnetically coupled to the driven member to drive the rotor, and
the control unit correcting rotational position of the rotor based on a detection signal from a first sensor portion provided so as to be capable of detecting displacement of the rotor, wherein
the core of the bearing stator member is formed in such a manner that its longitudinal sectional shape has:
a first portion which extends in a first direction orthogonal to a direction of facing the bearing rotor member, and around which the coil is wound;
a pair of second portions that extend to a bearing rotor member side from both end portions in the first direction of the first portion, and then extend in an orientation of approaching each other in the first direction; and
a pair of third portions that extend toward the bearing rotor member side from each of tip portions of the pair of second portions;
the pump further comprising:
a second sensor portion that detects rotational speed of a drive motor rotationally actuating the drive portion; and
a third sensor portion that detects rotational speed of the rotor,
wherein the control unit corrects rotational synchronization of the drive motor and the rotor based on detection signals from the second and third sensor portions.

* * * * *